UNITED STATES PATENT OFFICE.

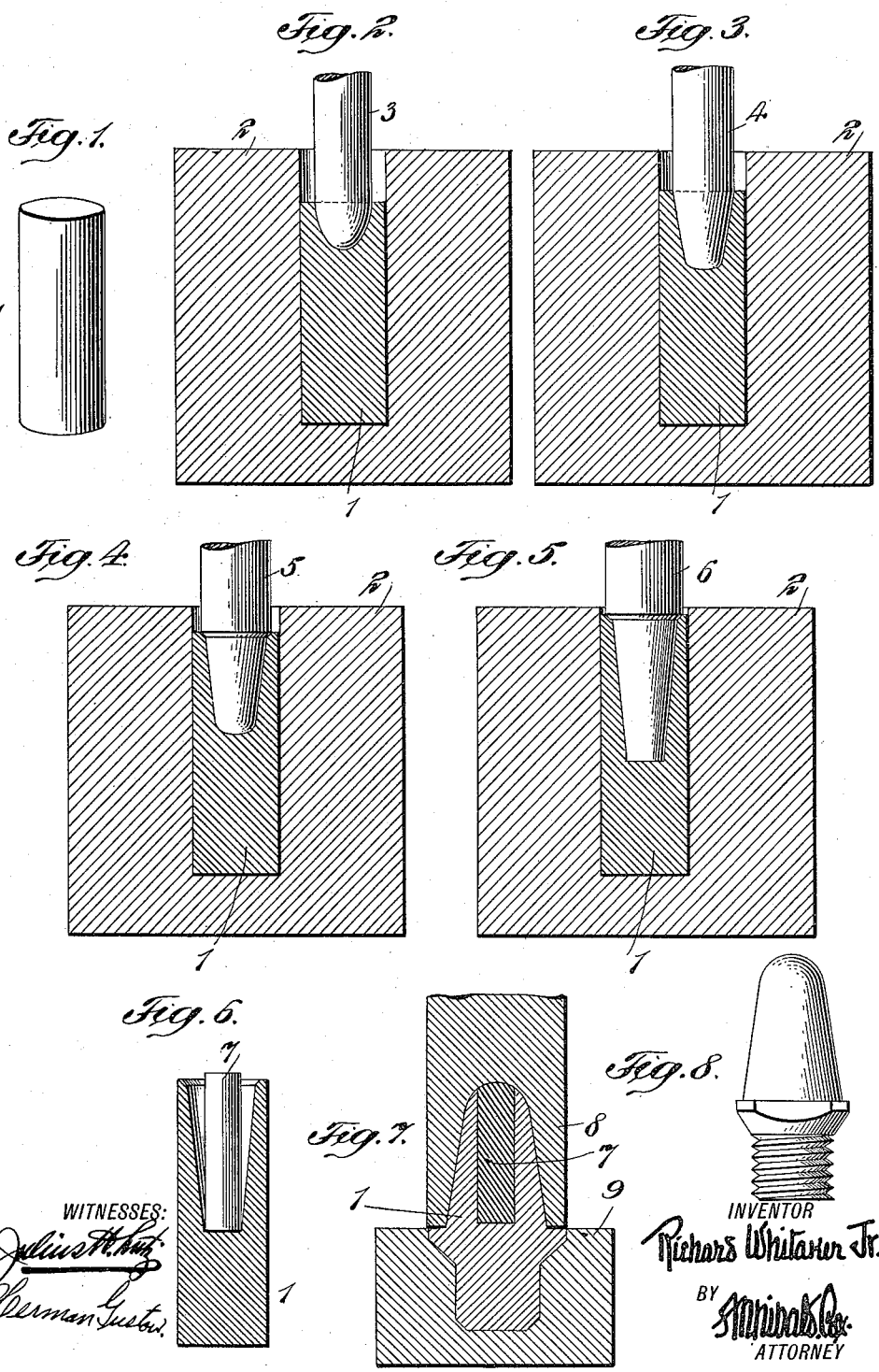

RICHARD WHITAKER, JR., OF NEW BRUNSWICK, NEW JERSEY, ASSIGNOR TO THE NEVERSLIP MANUFACTURING COMPANY, A CORPORATION OF NEW JERSEY.

PROCESS FOR MANUFACTURING HORSESHOE-CALKS AND THE LIKE.

1,158,877.  Specification of Letters Patent.  Patented Nov. 2, 1915.

Application filed May 25, 1911. Serial No. 629,300.

*To all whom it may concern:*

Be it known that I, RICHARD WHITAKER, Jr., a citizen of the United States, residing at New Brunswick, in the county of Middlesex and State of New Jersey, have invented a new and useful Process for Manufacturing Horseshoe-Calks and the like, of which the following is a specification.

The invention relates to an improved process by which the manufacture of horseshoe calks and other articles of metal, the manufacture of which involves the formation of a cavity of considerable depth in metal, is made less expensive and more perfect. The process is particularly valuable in the manufacture of horseshoe calks, but by obvious variations in details it is available in the manufacture of other articles which are produced in large numbers and the production of which involves making holes or cavities of considerable depth in metal, such as certain rivets, certain parts of wrenches, and the like. The process is shown herein applied to the manufacture of horseshoe calks because that illustrates it most clearly, and its application to other articles will be obvious.

Horseshoe calks of the kind to which the process relates comprise a center of very hard steel surrounded by somewhat softer steel, so that the calks remain pointed as they wear down. In the manufacture of them it is desirable to make the hard center of a separate piece of metal instead of drawing a specially prepared piece of metal with hard center (as was formerly practised), because the hard center is thus always the same (thereby avoiding uneven wear between different calks and consequent uneven tread of the shoe, which may result injuriously) and is stronger (partly because the differing metal does not extend through the screw shank) and in other respects superior. The manufacture of such calks with the hard center made from a separate piece of metal obviously involves the formation in the softer metal of a deep hole or cavity to receive the hard metal center or pin. The formation of this hole accurately and cheaply presents a problem, particularly in view of the fact that the articles are made in large numbers and a slight difference in the cost of making the hole is accordingly of great importance to the manufacturer. The same problem is presented in the manufacture of various other articles of metal. It is an object of this invention to solve that problem by providing a process by which, among other things, such a hole or cavity in pieces of metal may be made with great accuracy and at greatly reduced cost.

The process has several advantages in improving as well as cheapening the finished article. These are due largely to the increased accuracy with which the process makes the cavity and the saving in metal. They appear plainly when the process by which the cavity is made is compared with the methods heretofore used. Such cavities in articles of this character have heretofore been made by drilling. In manufacturing articles of this kind which are produced in great numbers the practical result of drilling is that a considerable number of cavities are not formed with sufficient accuracy. In particular, the bottom of the cavity is not so shaped as to afford a perfect foundation for the piece of hard metal or pin which, in the case of horseshoe calks, is a matter of importance because of the heavy blows upon the pin when the calk is in use. It might, of course, be possible to drill a perfect cavity, but as a practical matter it would involve an expense too great to permit of the employment of that method in the manufacture of articles of this class. Moreover, drilling results in the waste of a considerable amount of metal. The process herein described produces an accurate cavity of any desired shape and dimensions, accurately and economically.

The application of the process to the manufacture of horseshoe calks is illustrated in the accompanying drawing, which shows the progress of the manufacture of calks from the blank shown in Figure 1 to the finished article shown in Fig. 8.

In the drawings, 1 is a piece of metal, which is shown as constituting the blank in Fig. 1, in process in Figs. 2 to 7, and as the outer portion of the completed calk in Fig. 8.

2 is a matrix adapted to hold the blank 1 while the cavity is formed therein, which may be made as shown in the drawing or with a movable bottom.

3, 4, 5, 6, respectively, are successive plungers of proper shape to form the cavity, as hereinafter set forth.

7 is the center or pin of very hard steel.

8 and 9 are shaping dies.

The process comprises subjecting the metal to successive punches from properly shaped plungers. A blank containing the amount of metal which will finally appear in the completed article, and thus avoiding waste, is taken cold and placed in a matrix, 2, which receives and holds it, the matrix being of sufficient height to accommodate the metal caused to flow up by the pressure of the plunger. By any convenient means, a plunger, 3, is forced down upon the blank, which makes therein a cavity or hole of slight depth, the metal flowing up at the sides of the plunger. The plunger is then withdrawn and by any convenient means a second plunger, 4, is applied to the cavity or hole, with the result that it considerably deepens, as shown in Fig. 3. This plunger is then withdrawn and other plungers, 5 and 6, successively forced into the hole or cavity until it has attained the desired depth. In the case of horseshoe calks, four successive plungers may be used, as shown in the drawing. The number used depends chiefly upon the character of the cavity desired and the hardness of the metal used. It is desirable to have each successive plunger taper more than the next preceding plunger, substantially as indicated in the drawing. Having thus formed a cavity of the desired depth for the calk, the hard steel pin 7 is inserted, as shown in Fig. 6. The blank with the pin is then placed in dies and shaped by pressure, as shown in Fig. 7, and thereafter threaded, completing the article.

The plungers shown in the drawing are adapted to make a round cavity with a slightly concave bottom. By changing the form of the plungers the cavity may be made square or of other shape, as desired, and the depth may be varied within reasonable limits in accordance with the number of plungers used and the pressure exerted. In some articles the successive plungers will be used to convert the blank into a tube.

One of the advantages of the process is that it is practicable to use hard metal. It is, moreover, advantageous because no heating of the metal is required. It is plain that various additions may be made. For example, the shape of the plungers or some portions of them may be varied so as to make variations in the blank where that is desirable. An illustration of this is shown in the drawings, where the plungers 5 and 6 are so formed as to make a slight bevel around the top of the cavity. The number of plungers employed and their precise shape will vary in accordance with the article to be manufactured.

In actual practice it has been found that the process results in a great saving and improvement over processes heretofore used.

The claims made are—

1. The process of making compound metal articles which comprises forming a blank of suitable length; confining such blank with one face exposed in a holder having a cavity deeper than the length of the blank and adapted to prevent expansion of the blank except longitudinally; successively applying the force of a plurality of plungers upon a limited area of the exposed face of said blank to make a gradually deepening hole and causing the metal to flow in the opposite direction from the direction of the application of the plungers, while the width of said blank is maintained substantially uniform; inserting a piece of metal in the hole thus formed; and pressing the walls of the metal blank into holding contact with the inserted metal.

2. The process of making compound metal articles which comprises forming a blank of suitable length; confining such blank with one face exposed in a holder having a cavity deeper than the length of the blank and adapted to prevent expansion of the blank except longitudinally; applying the force of a plurality of plungers, each successive one being more tapered than the former, upon a limited area of the exposed face of said blank to make a gradually deepening hole and causing the metal to flow in the opposite direction from the direction of the application of the plungers, while the width of said blank is maintained substantially uniform; inserting a piece of metal in the hole thus formed; and pressing the walls of the metal blank into holding contact with the inserted metal.

3. The process of making compound metal articles which comprises forming a blank of suitable length; confining such blank with one face exposed in a holder having a cavity deeper than the length of the blank and adapted to prevent expansion of the blank except longitudinally; successively applying the force of a plurality of plungers, the last one having an end corresponding to the end of a piece of metal to be inserted in the hole, upon a limited area of the exposed face of said blank to make a gradually deepening hole and causing the metal to flow in the opposite direction to the direction of the application of the plungers, while the external dimension of said blank is maintained substantially uniform; inserting a piece of metal having an end corresponding to the end of said last plunger in the hole thus formed; and pressing the walls of the metal blank into holding contact with the inserted metal.

4. The process of making compound metal articles which comprises forming a blank of suitable size; confining the blank with one face exposed in a holder having a cavity deeper than the length of the blank and gradually lengthening the blank and making a deep hole in the same by successively applying the force of a plurality of plungers to cause the displaced metal to crowd the sides of the blank in a direction opposite to the direction of application of the plungers, inserting a piece of metal in the hole thus formed and pressing the walls of the hole into holding contact with the said piece of metal.

5. In the manufacture of compound metal articles the process which comprises forming a blank of suitable length; confining such blank with one face exposed in a holder having a cavity deeper than the length of the blank, whereby the blank is prevented from expanding except longitudinally; and successively applying the force of a plurality of plungers upon a limited area of the exposed face of said blank to make a gradually deepening hole and causing the metal to flow only in the opposite direction from the direction of the application of the plungers, while the external dimension of said blank is maintained substantially uniform.

6. The process of making compound metal articles which comprises forming a blank of suitable length; confining such blank with one face exposed in a holder having a cavity deeper than the length of the blank and adapted to prevent expansion of the blank except longitudinally; successively applying the force of a plurality of plungers of different cross sections at the engaging area upon a limited area of the exposed face of said blank to make a gradually deepening hole and causing the metal to flow in the opposite direction from the direction of the application of the plungers, while the width of said blank is maintained substantially uniform; inserting a piece of metal in the hole thus formed; and pressing the walls of the metal blank into holding contact with the inserted metal.

7. A process of manufacturing horseshoe calks or the like which comprises forming a blank of metal, inserting the blank in a matrix having a hole to receive the blank deeper than the length of the blank, applying to a particular portion of the blank the force of successive plungers each more tapered than the preceding and all of less diameter than the diameter of the hole in the matrix whereby a cavity is formed in the blank, inserting a pin of harder metal in the cavity and pressing the walls of the cavity into holding contact with the pin.

8. In the manufacture of horseshoe calks or the like the process which comprises making a deep cavity or hole in a piece of metal, inserting it in a matrix having a hole to receive it deeper than its length, applying at a particular point the force of successive plungers each more tapering than the preceding and all of less diameter than the diameter of the hole in the matrix whereby a cavity with slanting walls is made and pressing the metal so that the walls of the cavity become straight.

Signed at New Brunswick, in the county of Middlesex and State of New Jersey, this 23rd day of May, 1911.

RICHARD WHITAKER, Jr.

Witnesses:
 FRANK E. FISHER,
 PERCY L. VAN NINS.

Copies of this patent may be obtained for five cents each, by addressing the "Commissioner of Patents, Washington, D. C."